United States Patent Office 2,906,734
Patented Sept. 29, 1959

2,906,734
FAST CURING ORGANOSILOXANE RESINS

Harold A. Clark, Midland, Mich., assignor to Dow Corning Corporation, Midland, Mich., a corporation of Michigan No Drawing. Application September 23, 1957
Serial No. 685,366

2 Claims. (Cl. 260—46.5)

This application relates to siloxane resinous compositions which cure at or below 150° C. and is a continuation-in-part of applicant's copending application Serial No. 643,518, filed March 4, 1957, now abandoned.

There has been a long felt need in the siloxane industry for a siloxane resin which would cure at temperatures at or below 150° C. in one hour or less, to such an extent that the cured resin would be tack free while at a temperature of 150° C. Prior attempts to attain this result with pure siloxane resins have been at the sacrifice of the thermal stability of the cured resin. Thus, the silicone industry has had to get along with either slow cure and high thermal stability or fast cure with low thermal stability. The lack of thermal stability is generally exhibited by a crazing of the resin which results in loss of dielectric strength and other desirable properties.

Some attempts to avoid the difficulty have been made by employing various additives such as acrylate resins. The acrylate resins contribute to the cure of the silicone in that they give a particular non-tacky surface which is maintained until the silicone resin is fully cured. However, the use of additives suffers from the disadvantage that there is a difficult problem of compatibility between the acrylate resins and the silicones. As a result, the shelf life of the blends is not too good. This means if the mixture of the silicone acrylate is stored for a considerable time before use, hazy and cloudy materials are obtained which are undesirable.

It is the object of this invention to provide a silicone composition wherein the resin is a straight silicone resin, which composition will cure to a tack-free state at 150° C. in less than one hour at 150° C. or below. Another object of this invention is to provide a fast curing, thermally stable silicone resin composition which will be useful for electrical varnishes, and protective coatings. Another object is to provide a more efficient silicone resin for use as electrical insulation which will enable fabricators to operate at a higher rate of speed and thereby reduce the cost of silicone resin insulated electrical equipment. Another object is to provide a silicone resin which can be cured on substrates which cannot be subjected to the curing schedules previously employed with silicone resins. Other objects and advantages will be apparent from the following description.

This invention relates to a composition of matter consisting essentially of (1) a polysiloxane having a phenyl to silicon ratio not in excess of 0.85, a degree of substitution of from 1.3 to 1.7, and containing at least .8% by weight silicon-bonded hydroxyls based on the weight of the siloxane, said polysiloxane consisting of from 15 to 45 mol percent monophenylsiloxane, from 5 to 55 mol percent of either phenylmethylsiloxane or dimethylsiloxane or both, from 0 to 35 mol percent monomethylsiloxane and from 0 to 25 mol percent diphenylsiloxane, (2) at least .01% by weight based on the weight of the siloxane of a compound of the formula $RR'_3NOR''$ in which R is of the group aliphatic hydrocarbon radicals, hydroxy aliphatic hydrocarbon radicals, cycloaliphatic hydrocarbon radicals, hydroxylated cycloaliphatic hydrocarbon radicals, and aralkyl radicals, R' is an alkyl radical of less than 3 carbon atoms and R'' is an acyl radical of the group benzoyl and aliphatic acyl radicals of less than 5 carbon atoms having no more than one halogen atom beta to the carbonyl group, and (3) at least sufficient acid of the group benzoic acid and aliphatic monocarboxylic acids of less than 5 carbon atoms containing no more than one halogen atom beta to the carboxyl group, to render the composition neutral.

The term "consisting essentially of" as employed above and in the claims means that the compositions of this invention must contain the three specified ingredients but that they also may contain other non-essential ingredients such as solvents, pigments, fillers, additional catalysts, stabilizers, and other materials which are normally employed in siloxane resins.

The term "tack free" as employed herein means that the compositions were tack free when measured at 150° C. by the following test.

A piece of fuzzy asbestos was placed on the cured resin and pressed in place with a one inch steel cube. The whole assembly was then heated in an oven until all the components reached a temperature of 150° C. Upon cooling, if no asbestos fibers stuck to the film, the resin was considered tack free.

The siloxanes employed in the compositions of this invention should conform to the limitations abovestated if they are to be operative with the claimed catalysts. If the monophenylsiloxane is present in a concentration above 45 mol percent or the degree of substitution of the resin is less than 1.3, the resulting resin will be too brittle when cured. If the diphenylsiloxane is present in amount above 25 mol percent or if the total phenyl to silicon ratio is above .85, the resulting resin will not cure properly at 150° C. This is true of a resin having a degree of substitution above 1.7. If the silicon-bonded hydroxyl content is less than .8% by weight, the resin will be thermoplastic and will not cure properly at 150° C. In summary, the limitations in the polysiloxane of this invention are critical.

The polysiloxane of this invention can be a copolymer or a mixture of two or more of the defined siloxanes. For example, it can be a copolymer consisting of 45 mol percent monophenylsiloxane and 55 mol percent dimethylsiloxane; a copolymer consisting of 15 mol percent monophenylsiloxane, 55 mol percent dimethylsiloxane and 30 mol percent monomethylsiloxane; a copolymer of 45 mol percent monophenylsiloxane, 30 mol percent dimethylsiloxane and 25 mol percent phenylmethylsiloxane; a copolymer of 40 mol percent monophenylsiloxane, 10 mol percent phenylmethylsiloxane, 40 mol percent dimethylsiloxane and 10 mol percent either diphenyl or monomethylsiloxane and a copolymer of 30 mol percent monophenylsiloxane, 20 mol percent monomethylsiloxane, 15 mol percent diphenylsiloxane, 20 mol percent phenylmethylsiloxane and 15 mol percent dimethylsiloxane or mixtures of these copolymers.

When the siloxane (1) is a mixture, the individual components need not individually comply with the limitations of this invention. For instance, a mixture of a copolymer having .6% by weight hydroxyls with a copolymer having, for example, 3% by weight hydroxyls in such proportion that the hydroxyl content of the mixture was 1% by weight hydroxyl, would be operative. The same is true of a mixture where one or more copolymers has an excess of one ingredient, that is monophenylsiloxane, or too great a phenyl to silicon ratio or a degree of substitution outside the limits of the claims.

The catalysts employed herein are any quaternary ammonium salt of the formula $RR'_3NOR''$ in which R, R' and R″ are as above defined. It is preferable that the salt be soluble in hydrocarbon solvents. However, this is not essential since, if desired, oxygenated solvents such as alcohols, ethers, ketones and esters may be used to insure compatibility between the salt and the siloxane. The salts may be prepared in any suitable manner. That is, the salt may be prepared by reacting the corresponding quaternary hydroxide with the corresponding acid or they may be prepared by reacting a quaternary ammonium alkoxide or a quaternary ammonium salt of a weaker acid with the corresponding acids. For example, tetraethylammonium octoate can be reacted with monochloroacetic acid to give the salt tetraethylammonium-monochloroacetate.

Specific examples of operative salts are tetramethylammonium benzoate, gamma-hydroxypropyltrimethylammoniumpropionate, octadecyltrimethylammonium formate, benzyltriethylammonium butyrate, β-phenylethyltrimethylammonium - α - chloropropionate, cyclopentyltrimethylammonium - β - bromopropionate, allyltrimethylammonium acetate, hexenylethyldimethylammonium formate, cyclohexenyltrimethylammonium acetate, 4-hydroxycyclohexyltrimethylammonium - β - fluoropropionate, tetraethylammonium - monoiodoacetate, myricyltrimethylammoniumformate and isopropyltrimethylammoniumbenzoate. It should be understood that a mixture of two or more of any of the above salts can be employed.

Examples of acids (3) which are operative herein are benzoic, bromoacetic, butyric, isobutyric, 2,4-dichlorobutyric, β-fluoropropionic and monobromoacetic. Mixtures of two or more acids can be used and it is not necessary that the buffering acid correspond to the acyl radical on the quaternary ammonium salt. For example, acetic acid can be used with a formate salt.

The real success of the compositions of this invention resides in the use of the acid as a buffering agent for the quaternary ammonium salt. The use of the acid gives a maximum shelf life so that the composition can exist for a reasonable length of time without gelation. At the same time, the buffered solution acts as a fast curing catalyst when subjected to elevated temperatures. In general, the amount of acid employed is in the neighborhood of 2 to 4 mols of acid per mol of the quaternary ammonium salt. However, the precise amount of acid employed will vary from composition to composition depending upon the system used. In all cases the amount of acid should be sufficient to render the siloxane-catalyst composition non-alkaline. If desired, an excess of acid over that required to neutralize the catalyst can be used. A good way of ascertaining whether or not sufficient acid has been added is to add the acid to the quaternary ammonium salt until the resulting solution tests neutral to the indicator Bromcresole Purple dissolved in an equal weight mixture of butanol and toluene. The catalyst acid solution is then ready for addition to the siloxane system.

It should be understood, of course, that the procedure is not restricted to this method of operation. If desired, the acid can be added to the siloxane and the quaternary ammonium salt added later.

The compositions of this invention are generally employed in the form of solutions in organic solvents such as aromatic and aliphatic hydrocarbons, halogenated hydrocarbon solvents and ethers. The viscosity of the solution can be varied to any desired extent depending upon the use to which the siloxane composition is to be put. When the composition is to be employed as a dipping varnish for electrical equipment it is desirable that the resin concentration be such that the viscosity of the solution should be between 75 and 300 cps. Such solutions will give sufficient build on the equipment to give satisfactory electrical insulation.

The primary advantages of the use of the composition of this invention reside in the combination of fast curing at low temperatures and maximum thermal stability. The thermal stability is indicated by retention of dielectric strength at elevated temperatures, by resistance to crazing, and by prolonged flex life. The stability is also indicated by extremely low weight loss at 250° C. Another primary advantage of the composition is that the above desirable properties have been obtained without sacrificing the handling properties of the composition. That is, the shelf life, ease of applicability and cost have not been adversely affected.

The following examples are illustrative only and should not be construed as limiting the invention which is properly delineated in the appended claims.

*Example 1*

The catalyst employed in this example was prepared by adding 5 g. of a 35% by weight solution of benzyltrimethyl ammonium hydroxide in methanol to 10 g. of glacial acetic acid. The resulting solution was then diluted with 25 g. of butanol. This solution tested neutral with Bromcresole Purple in a butanol-toluene solution.

The catalyst solution was then added to the following siloxane in amount to give .1% by weight benzyltrimethyl ammonium acetate based on the weight of the siloxane. The siloxane was a mixture of 50% by weight of a copolymer of 30 mol percent monomethylsiloxane, 20 mol percent monophenylsiloxane and 50 mol percent phenylmethylsiloxane which had a silicon-bonded hydroxyl content of 3% by weight, and 50% by weight of a siloxane having an identical composition except that the silicon-bonded hydroxyl content was .6% by weight. The mixed siloxanes were in a 50% by weight toluene solution.

The catalyzed siloxane resin solution was then applied to aluminum panels and heated at 150° C. The resin film cured to a tack-free state in less than 30 minutes.

*Example 2*

A toluene solution of a siloxane having the composition 25 mol percent monomethylsiloxane, 35 mol percent monophenylsiloxane, 20 mol percent dimethylsiloxane and 20 mol percent diphenylsiloxane, said siloxane containing 3.2% by weight silicon-bonded hydroxyls, was mixed with the catalyst of Example 1 in amount to give .2% by weight benzyl trimethyl ammonium acetate based on the weight of the siloxane. The catalyzed resin solution was then applied to aluminum panels and heated at 150° C. for 1 hour. The resin had cured to a tack-free state.

*Example 3*

2700 g. of a 60% toluene solution of a copolymer of 31.2 mol percent monomethylsiloxane, 31.2 mol percent phenylmethylsiloxane, 7.6 mol percent diphenylsiloxane and 30 mol percent phenylmethylsiloxane which contained .075% by weight zinc added as the zinc octoate, and .6% by weight silicon-bonded hydroxyls were mixed with 750 g. of a 72.5% xylene solution of a copolymer of 25 mol percent monomethylsiloxane, 15 mol percent monophenylsiloxane, 10 mol percent diphenylsiloxane and 50 mol percent phenylmethylsiloxane containing 3% by weight silicon-bonded hydroxyls. The resulting solution was divided into four portions and to each portion was added the amount of benzyltrimethyl ammonium acetate in the form of the catalyst of Example 1, as shown in the table below. Each catalyzed solution was then coated on aluminum panels and cured 15 minutes at 150° C.

| Catalyst in percent by weight | State of cure |
| --- | --- |
| 0 | Not even gelled. |
| .05 | Slightly tacky at 150° C. |
| .1 | Non-tacky. |
| .15 | Do. |

All of the cured resins shown in the above examples showed excellent dielectric strength after prolonged heating at a temperature of 300° C. and were eminently useful for electrical varnishes and for protective coatings for metal surfaces.

Example 4

The buffered catalyst solution employed in this example was prepared by diluting 28.55 g. of a 35% methanol solution of benzyltrimethyl ammonium hydroxide (.06 mol) with an equal volume of n-butanol and then adding to the solution 3.45 g. of formic acid (.075 mol). A slight precipitate formed but redissolved upon the addition of 15 drops of water. The resulting solution was diluted to 100 g. with methanol.

This catalyst solution was added to a 55.8% by weight solution of an organosiloxane resin dissolved in a solvent comprising 10% by weight butanol and 90% by weight xylene, in amount so that there was .2% by weight of the catalyst calculated as benzyltrimethyl ammonium hydroxide based on the weight of the siloxane resin. The siloxane resin was a mixture of 75% by weight of a copolymer of 28 mol percent monomethylsiloxane, 27 mol percent monophenylsiloxane, 40 mol percent phenylmethylsiloxane, and 5 mol percent diphenylsiloxane, containing 1% by weight silicon-bonded hydroxyls and 25% by weight of a copolymer of identical composition containing 3.5% by weight silicon-bonded hydroxyls.

The catalyzed resin solution was applied to aluminum panels and then heated at 150° C. It cured to a tack-free state after 30 minutes at that temperature.

Example 5

Equal weights of a 20% by weight butanol solution of beta-hydroxyethyltrimethylammonium 2-ethylhexoate and a 10% by weight butanol solution of monochloroacetic acid were mixed. The resulting product was diluted with an equal weight of butanol to give a 5% by weight solution of the salt beta-hydroxyethyltrimethylammoniummonochloroacetate.

4 g. of this catalyst solution and 8 g. of butanol were added to 150 g. of a 50% toluene solution of a mixture of 36.5 g. of a copolymer of 35 mol percent phenylmethylsiloxane, 10 mol percent dimethylsiloxane, 25 mol percent monomethylsiloxane and 30 mol percent monophenylsiloxane containing about 1% by weight silicon-bonded hydroxyls and 38.5 g. of a copolymer of identical composition containing 3% by weight silicon-bonded hydroxyls.

The resulting solution was applied to aluminum panels and was found to cure tack free in 30 minutes at 150° C.

Example 6

25 g. of a 20% methanol solution of beta-hydroxyethyltrimethylammonium hydroxide were mixed with 15 g. of butanol and 15 g. of benzoic acid. The mixture was stirred until a clear solution was obtained and then butanol was added in amount sufficient to give a 5% solution of the salt beta-hydroxyethyltrimethylammoniumbenzoate.

2.5 g. of this catalyst solution was added to a mixture of 150 g. of a 50% xylene solution of a copolymer of 25 mol percent monomethylsiloxane, 35 mol percent monophenylsiloxane, 20 mol percent dimethylsiloxane and 20 mol percent diphenylsiloxane containing about .9% by weight silicon-bonded hydroxyls and 83 g. of a 60% toluene solution of an identical copolymer containing 3% by weight silicon-bonded hydroxyls.

The resin solution cured on aluminum panels to a tack-free state in less than 30 minutes at 150° C.

Example 7

Equivalent results are obtained when the following salt-acid mixtures are employed, in the ratio of 2 mols of acid per mol of salt, with the siloxane mixture of Example 6 in amount such that there is .2% by weight salt based on the weight of the siloxane mixture.

| Salt | Acid |
| --- | --- |
| Myricyltriethylammonium formate | Formic acid. |
| 4-hydroxycyclohexyltrimethylammonium acetate. | Propionic acid. |
| Allylethyldimethylammoniumbutyrate | Acetic acid. |
| Tetramethylammonium acrylate | Acrylic acid. |
| Tetraethylammonium β-bromo-propionate | β-bromopropionic acid. |
| Cyclopentyltrimethylammonium acetate | Acetic acid. |

That which is claimed is:

1. A composition of matter consisting essentially of (1) a copolysiloxane having a phenyl to silicon ratio not in excess of 0.85, a degree of substitution of from 1.3 to 1.7, and containing at least .8% by weight silicon-bonded hydroxyls based on the weight of the polysiloxane, said polysiloxane consisting of from 15 to 45 mol percent monophenylsiloxane, from 5 to 55 mol percent of a siloxane selected from the group consisting of phenylmethylsiloxane and dimethylsiloxane, from 0 to 35 mol percent monomethylsiloxane and from 0 to 25 mol percent diphenylsiloxane, (2) at least .01% by weight based on the weight of the siloxane of benzyl trimethyl ammonium acetate, and (3) at least sufficient acetic acid to render the composition neutral.

2. A composition of matter consisting essentially of (1) a copolysiloxane having a phenyl to silicon ratio not in excess of 0.85, a degree of substitution of from 1.3 to 1.7, and containing at least .8% by weight silicon-bonded hydroxyls based on the weight of the polysiloxane, said polysiloxane consisting of from 15 to 45 mol percent monophenylsiloxane, from 5 to 55 mol percent of a siloxane selected from the group consisting of phenylmethylsiloxane and dimethylsiloxane, from 0 to 35 mol percent monomethylsiloxane and from 0 to 25 mol percent diphenylsiloxane, (2) at least .01% by weight based on the weight of the siloxane of a compound of the formula RR'$_3$NOR" in which R is of the group aliphatic hydrocarbon radicals, hydroxylated aliphatic hydrocarbon radicals, cycloaliphatic hydrocarbon radicals, hydroxylated cycloaliphatic hydrocarbon radicals and aralkyl radicals, R' is an alkyl radical of less than 3 carbon atoms and R" is an acyl radical of the group consisting of benzoyl and aliphatic acyl radicals of less than 5 carbon atoms having no more than one halogen atom beta to the carbonyl group, and (3) at least sufficient acid of the group consisting of benzoic acid and aliphatic monocarboxylic acids of less than 5 carbon atoms containing no more than one halogen atom beta to the carboxyl group, to render the composition neutral.

References Cited in the file of this patent

UNITED STATES PATENTS

| 2,258,222 | Rochow | Oct. 7, 1941 |
| 2,518,160 | Mathes | Aug. 8, 1950 |

FOREIGN PATENTS

| 500,159 | Canada | Feb. 23, 1954 |

UNITED STATES PATENT OFFICE
CERTIFICATE OF CORRECTION

Patent No. 2,906,734            September 29, 1959

Harold A. Clark

It is hereby certified that error appears in the printed specification of the above numbered patent requiring correction and that the said Letters Patent should read as corrected below.

Column 4, line 53, for "phenylmethylsiloxane" read -- monophenylsiloxane --.

Signed and sealed this 12th day of April 1960.

(SEAL)
Attest:

KARL H. AXLINE            ROBERT C. WATSON
Attesting Officer            Commissioner of Patents